(12) United States Patent
Scholz

(10) Patent No.: US 7,877,363 B2
(45) Date of Patent: Jan. 25, 2011

(54) USING LIMIT VARIABLES IN A COMPUTER SYSTEM

(75) Inventor: Martin Scholz, Nussloch (DE)

(73) Assignee: SAP Aktiengesellschaft, Walldorf ( * ) Notice: Subject to any disclaimer, the term of this patent is extended or adjusted under 35 U.S.C. 154(b) by 1866 days.

(21) Appl. No.: 10/767,907

(22) Filed: Jan. 29, 2004

(65) Prior Publication Data

US 2005/0171975 A1 Aug. 4, 2005

(51) Int. Cl.
G06F 7/00 (2006.01)
G06F 17/00 (2006.01)

(52) U.S. Cl. ..................................... 707/687
(58) Field of Classification Search .............. 707/104.1; 715/780; 704/1, 9
See application file for complete search history.

(56) References Cited

U.S. PATENT DOCUMENTS

| | | | | |
|---|---|---|---|---|
| 6,513,002 | B1 * | 1/2003 | Gillam | 704/9 |
| 6,714,220 | B2 * | 3/2004 | Sigl | 715/780 |
| 2002/0143521 | A1 * | 10/2002 | Call | 704/1 |
| 2005/0171975 | A1 * | 8/2005 | Scholz | 707/104.1 |

OTHER PUBLICATIONS http://www.lentyree.com/lensdtcv.htm— "Date Conversion Converts Gregorian and Julian Dates", 1 page, printed from the Internet on Jan. 27, 2004.
http://www.revelation.com/knowledge.nsf/0/ 912f03af083c35dd852563e0004c1e4e?OpenDocument— "Date Fields in Selects (TB #112)", 4 pages, printed from the Internet on Jan. 27, 2004.

* cited by examiner

*Primary Examiner*—Mohammad Ali
*Assistant Examiner*—Patrick A Darno
(74) *Attorney, Agent, or Firm*—Fish & Richardson P.C.

(57) ABSTRACT

An expression entered by a user to set a limit variable for a numerical range may be received in a computer system. The expression signifies to the user that the numerical range is unlimited. The limit variable can only be set with a numerical value. The limit variable is set with a first numerical value that is within a predetermined extreme portion of the numerical range. A command to display a limit variable for a numerical range may be received in a computer system. The limit variable is set with a numerical value. If the numerical value is within a predetermined extreme portion of the numerical range, an expression is displayed to a user that signifies to the user that the numerical range is unlimited. If the numerical value is not within the predetermined extreme portion of the numerical range, the numerical value is displayed to the user.

23 Claims, 4 Drawing Sheets

USING LIMIT VARIABLES IN A COMPUTER SYSTEM

TECHNICAL FIELD

This description relates to using limit variables in a computer system.

BACKGROUND

Some records in computer systems are associated with validity periods. For example, an organization may use validity periods with residence addresses of its employees that are stored in a computer database. When an employee moves, the employee's current address is updated with an "end date" to signify that it is no longer a current address and the employee's new address is entered with a corresponding "begin date". In other words, the system may have a data model specifying that every address record should have begin and end dates associated with it.

This data model causes a problem when the employee's new address is being entered, because its end date is typically not known at that time. Yet the data model may require an end date to be entered for the record to be acceptable. One approach that is used to overcome this problem is to enter an "extreme" value as the end date for the new address record. For example, when the data model lets year values be entered with four digits, values like 9999-12-31 are sometimes entered as the end date for a validity period. That is, the extreme value is not a "true" end date but is used to signify that the validity period has an indefinite range. Such end dates typically do not cause any problems within the computer system because they are virtually certain to be obsolete or replaced with an actual end date long before they become valid.

The use of extreme values can be problematic, however, outside the computer system. Some users find it inconvenient or distracting to see validity periods ending several thousand years in the future. These values may also increase the risk for mistakes, for example because a user can mistake the extreme date 9999-12-31 for 99-12-31. The extreme dates are also hard to distinguish from contemporary dates in a list, and it can therefore be difficult to quickly separate valid records (which have extreme values as their end dates) from invalid records (whose end dates have already occurred). Moreover, because extreme dates are used to signify that the validity range is unlimited, there is little benefit in making the user read and absorb the entire, say, ten digits of such an expression. Extreme values may be used with numerical ranges other than validity periods, and the disadvantages are essentially the same.

SUMMARY

The invention relates to using limit variables in a computer system. In a first general aspect, a method comprises receiving an expression entered by a user to set a limit variable for a numerical range in a computer system. The expression signifies to the user that the numerical range is unlimited. The limit variable can only be set with a numerical value. The method comprises setting the limit variable with a first numerical value that is within a predetermined extreme portion of the numerical range.

In selected embodiments, the numerical range is a date range, the limit variable an end date for the date range and the first numerical value a first date. In such embodiments, the predetermined extreme portion may be selected such that, practically, a system date of the computer system will never reach the predetermined extreme portion of the date range.

In a second general aspect, a method of using a limit variable in a computer system comprises receiving a command to display a limit variable for a numerical range. The limit variable is stored in a computer system and is set with a numerical value. If the numerical value is within a predetermined extreme portion of the numerical range, the method comprises displaying an expression to a user that signifies to the user that the numerical range is unlimited. If the numerical value is not within the predetermined extreme portion of the numerical range, the method comprises displaying the numerical value to the user.

In selected embodiments, the numerical range is a date range, the limit variable an end date for the date range and the first numerical value a first date. In such embodiments, the predetermined extreme portion may be selected such that, practically, a system date of the computer system will never reach the predetermined extreme portion of the date range.

Advantages of the systems and techniques described herein may include any or all of the following. Providing a user interface that is more user friendly. Providing more efficient use of limit variables. Reducing the risk of user mistakes regarding limit variables. Providing Useful customization of a computer system. Avoiding the display of intentionally set extreme values to a user. Providing that a data record can be provided with a practically unlimited validity range when its data model requires specific begin and end dates to be set for the validity range.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1A:
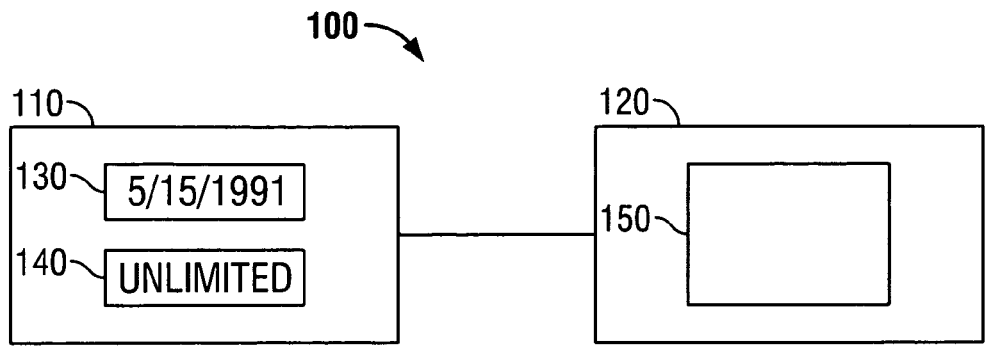
FIGS. 1A and B are block diagrams of a computer system performing an input operation regarding a limit variable.
Figure 1B:
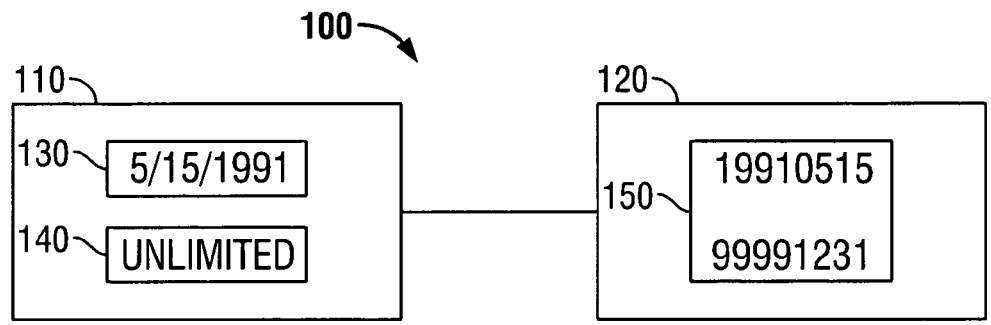

FIGS. 1A and 1B show a computer system 100 having a user interface 110 with which a user can interact and a processing component 120 in which at least one software application is being executed. At the stage shown in FIG. 1A, the system 100 is prompting the user to enter a begin date and an end date for a validity range associated with some record in the system. In this example, the user knows that the record has a begin date but not a specific end date. The user enters "5/15/1991" in a field 130, which is an input and output field associated with a begin date. For reasons that will be described below, the user also enters the word "UNLIMITED" in a field 140 to signify that the validity range is unlimited. The field 140 is an input and output field associated with an end date. The system 100 is configured to store begin and end dates in a memory 150. That is, the system 100 stores a limit variable that is to be set with the begin date value, and stores another limit variable that is to be set with the end date value. Accordingly, the limit variables are set with their respective values stored in memory 150. The stored values can be used to produce output in the fields 130 and 140, as will be described.

The system converts the inputs made in fields 130 and 140 before setting the respective limit variables. The input in field 130 is converted to "19910515", which is an internal representation that the system 100 uses for the date 5/15/1991, and stores this value in memory 150 as shown in FIG. 1B. As will be described below, the system recognizes the word "UNLIMITED" and converts it to "99991231", which corresponds to the date 12/31/9999, and stores this value in memory 150.

Figure 2A:
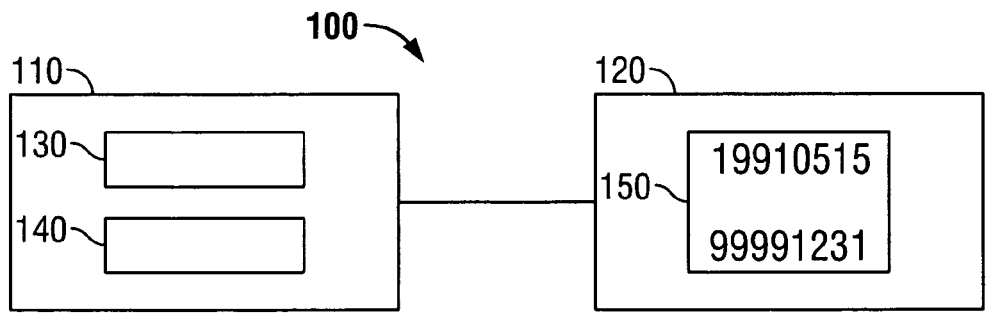
FIGS. 2A and B are block diagrams of a computer system performing an output operation regarding a limit variable.
Figure 2B:
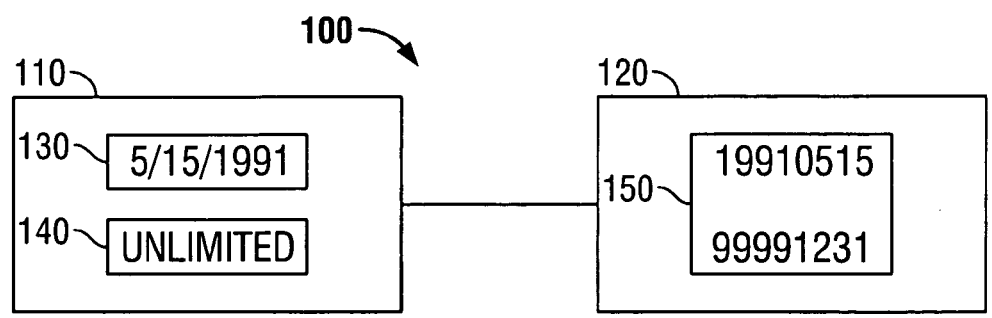

FIGS. 2A and 2B show the system 100 with the two values described above stored in memory 150. The user interface 110 does not presently have any information contained in the fields 130 and 140. For example, the system 100 has been rebooted after the user made the above described inputs. In FIG. 2A, the system receives a command to output the begin and end dates that are stored in memory 150. The system responds to the command by determining what, if any, conversion(s) of the stored values should be done before displaying them in the user interface. The system converts the begin date "19910515" to the format "5/15/1991" and displays it in field 130 as shown in FIG. 2B. As will be described below, the system recognizes that the end date "99991231" is an extreme date and so displays the word "UNLIMITED" in the field 140. For example, the system may be preprogrammed to recognize that any date later than a certain date (e.g., the year 5000) will be recognized as an extreme date.

The examples described with reference to FIGS. 1A, 1B, 2A and 2B show that a user enters an expression that signifies to the user that a range is unlimited and that a system converts such an expression to a value. Thereafter, the system can convert the value to the expression for display to the user. Thus, the system lets the user work with a meaningful expression and not be distracted with the specific end date with which the system sets the limit variable.

A specific exemplary system that can input and output values for limit variables will now be described with reference to FIG. 3. System 300 includes at least one application 310. A user can interact with the system 300 using a user interface 320. That is, the user interface 320 can be displayed on a display device 330 for the user to receive output from the system 300. The user interface 320 lets the user input information to the system 300 using input device(s) 340.

The application 310 includes at least one numerical range 342 that is limited by an upper limit variable 344 and a lower limit variable 346. For example, the numerical range 342 is a validity range for a record used by the application 310. As another example, the numerical range 342 relates to acceptable values of a processing parameter in a manufacturing plant. The variables 344 and 346 can be set by the user through suitable inputs using the user interface 320.

Suppose now, similarly to the situation in FIG. 1A, that the system 300 prompts the user to input values for the variables 344 and 346. In this example, the user intends to set the lower limit variable 346 to a specific value but wishes to leave the upper limit variable 344 unspecified or undetermined. The user therefore inputs a certain value for the lower limit variable 346, using an input field similar to the field 130. For the upper limit variable 344, the user enters an expression that signifies to the user that the numerical range 342 is unlimited. The expression may be entered in a field similar to the field 140. By executing instruction contained in a kernel 350, the system 300 recognizes that the value and the expression have been input in their respective fields. The kernel 350 is configured to cause the system 300 to determine which of conversion routines 360 should be applied to the inputs, as will now be described.

The system 300 has a data model 370 that includes a plurality of data types 372 to which each variable used in the system can be assigned. Any specific data type 372 contains various information about the variable that the system 300 uses in its operations, including an assignment of the variable to a specific one of the conversion routines 360. In this example, the data types 372 include data elements 374 assigned to respective domains 376. Any specific data element 374 is a collection of semantic information about the variable, such as labels, descriptions and associations with other variables. Any specific domain 376 contains technical information about the data element, such as its field length and field type. Accordingly, each variable in the system 300 is assigned to one of the data elements 374 which is assigned to one of the domains 376, and together the data elements 374 and the domains 376 form a particular one of the data types 372. This example will be further illustrated with reference also to the following table of exemplary variables and data type assignments:

TABLE 1

| Variable | Data element | Domain | Standard Conversion Routine | Special Conversion Routine |
| --- | --- | --- | --- | --- |
| ADDR_BEGIN | ADDR_BEGIN_DATE | BEGIN_DATE | DATE_CONV | |
| ADDR_END | ADDR_END_DATE | END_DATE | DATE_CONV | DATE_CONV_UNLIMITED |
| CONTRACT_BEGIN | CONTRACT_BEGIN_DATE | BEGIN_DATE | DATE_CONV | |
| CONTRACT_END | CONTRACT_END_DATE | END_DATE | DATE_CONV | DATE_CONV_UNLIMITED |

Suppose that the lower limit variable 346 is the ADDR_BEGIN variable listed in the Variable column on the first row of Table 1, and that the upper limit variable 344 is the ADDR_END variable listed on the second row of the Variable column. Thus, when the inputs for these respective variables are received, the system 300 knows according to the second column of Table 1 that the former variable is assigned to the ADDR_BEGIN_DATE data element and that the latter variable is assigned to the ADDR_END_DATE data element. According to the third column of Table 1, the ADDR_BEGIN_DATE data element is assigned to the BEGIN_DATE domain and the ADDR_END_DATE data element is assigned to the END_DATE domain.

The system 300 applies the conversion routine listed in the "Standard Conversion Routine" column of Table 1 unless there is a conversion routine listed in the "Special Conversion Routine" column, which takes precedence. Thus, for the lower limit variable 346 the system will apply the DATE_CONV conversion routine and for the upper limit variable 344 the system will apply the DATE_CONV_UNLIMITED conversion routine. In FIG. 3, the DATE_CONV conversion routine is shown as conversion routine 360A, and the DATE_CONV_UNLIMITED conversion routine is shown as conversion routine 360B.

The conversion routine 360A is a default that is listed in the fourth column of Table 1 for each of the four date variables. This routine converts the input information to a date format that the system uses. For example, the routine 360A converts the input "5/15/1991" to the format "19910515" and provides that the lower limit variable 346 is set with this value.

The conversion routine 360B, in contrast, is capable of converting an expression to a value and vice versa. That is, when the system applies this routine, it is determined whether the expression entered by the user for the upper limit variable 344 is one of the expressions 380 that the system recognizes when executing the conversion routine 360B. For example, expressions 380 include the following words: unlimited, unrestricted, current, present, eternal, infinite, endless, forever, and variations thereof. The expressions 380 may include a phrase such as "no end date" or "there is no limit". The expressions 380 may include a symbol such as ∞, the mathematical symbol for infinity. The above are merely examples of expressions 380. Other expressions that signify to the user that the numerical range is unlimited may be used.

If the expression entered by the user is one of the expressions 380, the conversion routine 360B causes it to be converted to a value for the upper limit variable 344 that is within a predetermined extreme portion (PEP) 390 of the numerical range 342. The PEP 390 may be selected so that the upper limit variable 344 for practical purposes will never be met. For example, with date variables the PEP 390 can be set to start a thousand or more years into the future and may end on the last date that can be represented in the system 300. This guarantees, for practical purposes, that a system date of the system 300 (i.e., the current date that is used within the system), will never reach the PEP 390. To further exemplify, the PEP 390 may be selected based on the highest value with which the particular limit variable can be set.

Here, the expression entered by the user is converted into the value "99991231", which is the last date that can be represented with a four-digit year value. The routine 360B then provides that the upper limit variable 344 is set with that value. If the expression entered by the user is not one that the system 300 recognizes when executing the routine 360B, the system may generate an error message or take some other default action.

The conversion routines 360 may be analogously used when the system 300 outputs variable values to a user. Suppose, therefore, that the execution of application 310 calls for outputting the values of its variables 344 and 346 to the user. Typically, the application 310 generates a command directed to the kernel 350 that may be referred to as a "print" or "write" command. The command causes the system 300 to determine which of the conversion routines 360 should be applied. Referring again to the above description of Table 1, the system determines that the conversion routine 360A should be used for the variable 346 and that the conversion routine 360B should be used for the variable 344. The routine 360A converts the value "19910515" into a format dedicated for display, such as "5/15/1991", and provides it for display to the user. For example, the output can be made in field 130 as shown in FIG. 2B. The routine 360B determines that the value of the, upper limit variable 344 is within the PEP 390 and converts it to one of the expressions 380 that signifies to the user that the numerical range 342 is unlimited. Accordingly, the routine 360B may identify a variable as being a candidate for being converted into an expression based on whether its value lies within the PEP 390, whether or not this value was provided by the routine 360B. This means that the routine 360B can convert also variables whose values were manually set within the PEP 390. This may be useful if the routine 360B is implemented in a system where one or more variables are already set with extreme values, because the PEP 390 can be selected such that the routine recognizes these existing extreme values and provides a suitable expression for the user when they are output.

The routine 360B may convert the value to a predetermined one of the expressions 380. In this example, the routine 360B converts the value "99991231" to the word "UNLIMITED". The routine 360B may then provide the expression for display to the user, for example in field 140 as shown in FIG. 2B. If the routine 360B determines that the variable value is not within the PEP 390, it may convert the value to a dedicated display format, similar to the conversion done by routine 360A.

Figure 3:
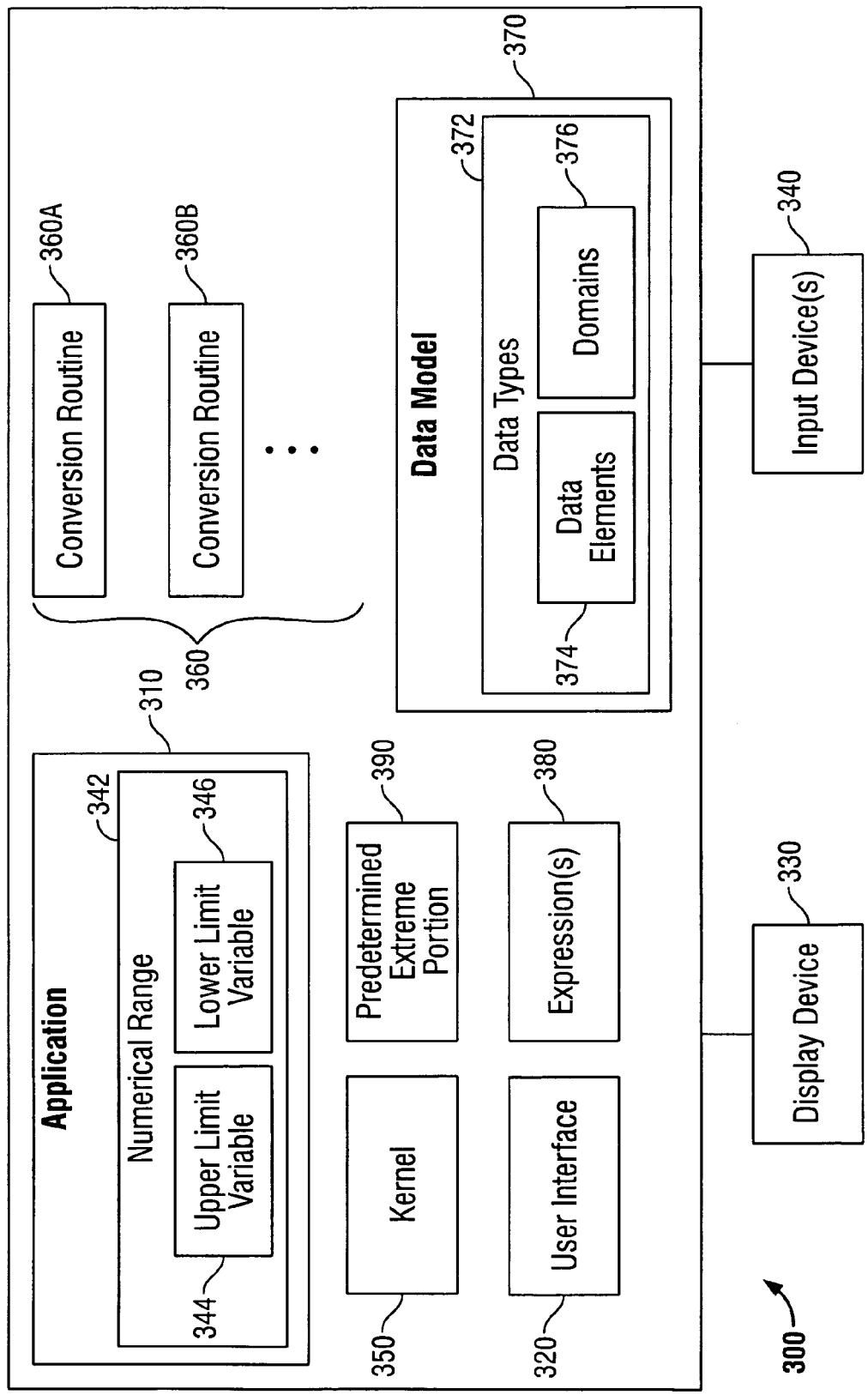
FIG. 3 is a conceptual block diagram of a computer system capable of inputting and outputting values for limit variables.

FIG. 3 shows the expression(s) 380 and PEP 390 separate from the conversion routines 360 in the exemplary system 300. In other implementations, they may be programmed into the appropriate routine(s) 360. For example, the conversion routine 360B may include code that is conceptually equivalent to the following syntax:

If input="unlimited"→provide that limit variable is set with "99991231"

and

If variable to be output is within PEP 390→provide "unlimited" for display

The conversion routines 360 may be used with variables for other entities than dates. For example, the routine 360A may provide an external representation wherein negative numbers are preceded by a minus sign. That is, the routine 360A may convert a first bit of an internal value (which is set to one if the value is a negative number) into a minus sign that is displayed before the value in the external representation. Moreover, the conversion routine 360B can convert the value to an expression if the value is within the PEP 390 or else add the minus sign like routine 360A. As another example, the routine 360A can convert an internal time value "081045" to the external format "08:20:45". Similarly, the routine 360B can convert the internal time value to an expression if it is within the PEP 390, or otherwise convert it to the external format.

As yet another example, the systems and techniques described herein may be used also with a numerical range that is not defined by two limit variables. For example, a data model may require only an end date (or a begin date) regarding the validity of a data record, in which case the numerical range has only one limit variable. The single limit variable may be an upper limit variable or a lower limit variable.

Figure 4:
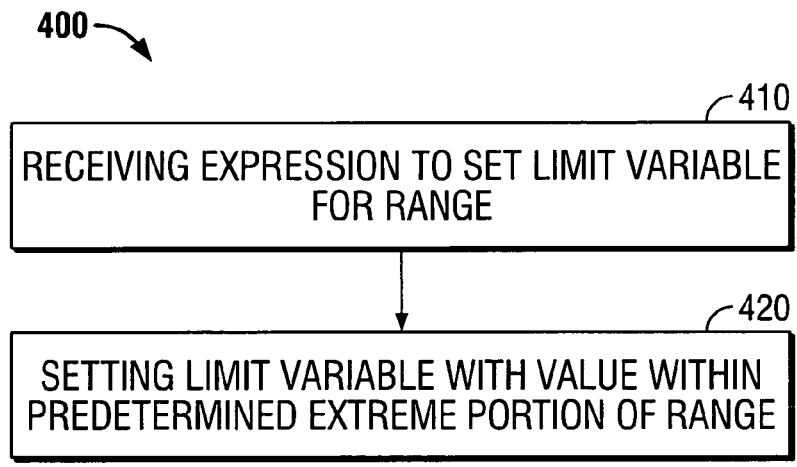
FIGS. 4 and 5 are flow charts of methods of using limit variables.
Figure 5:
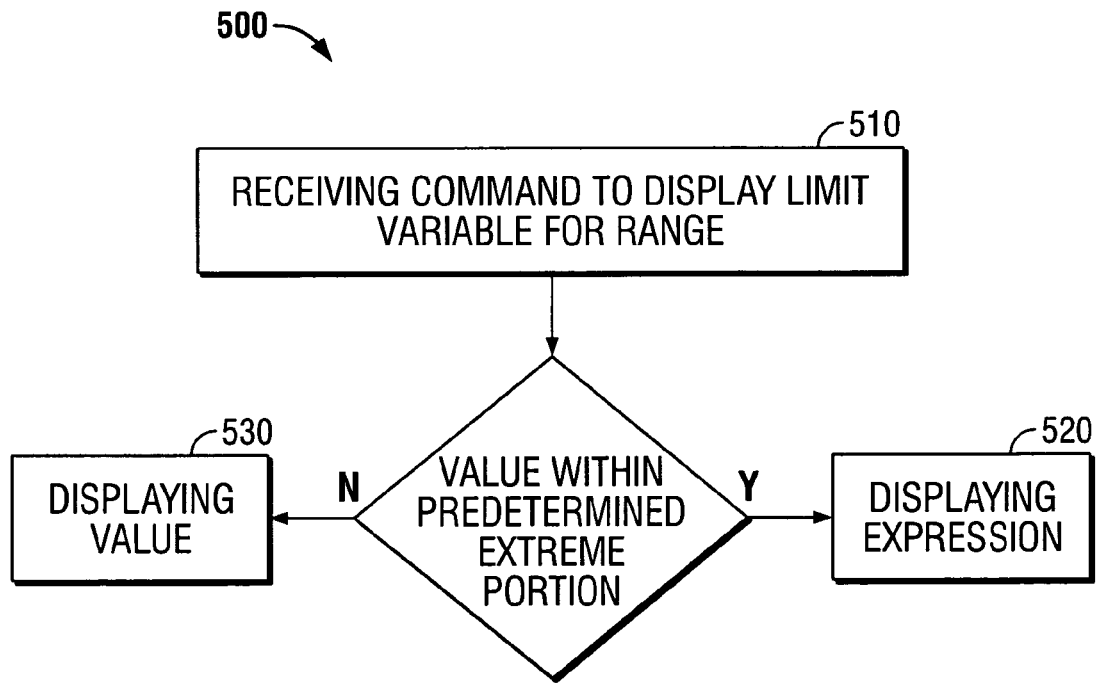

FIGS. 4 and 5 are flow charts of methods 400 and 500, respectively, of using limit variables. Method 400 may be executed by a system when a user is making an input for setting a limit variable. For example, a computer program product can include instructions that cause a processor of the system 300 to execute the steps of method 400. Method 500 may be executed by a system when it is to display a limit variable to a user. For example, a computer program product can include instructions that cause a processor of the system 300 to execute the steps of method 500.

As shown in FIG. 4, method 400 includes the following steps:

Receiving in step 410 an expression entered by a user to set a limit variable (344, 346) for a numerical range 342, which expression signifies to the user that the numerical range 342 is unlimited.

Setting in step 420 the limit variable (344, 346) with a value that is within a predetermined extreme portion 390 of the numerical range 342.

As shown in FIG. 5, method 500 includes the following steps:

Receiving in step 510 a command to display a limit variable (344, 346) for a numerical range 342, the limit variable being set with a numerical value.

If the numerical value is within a predetermined extreme portion of the numerical range, displaying in step 520 an expression to a user that signifies to the user that the numerical range is unlimited.

If the numerical value is not within the predetermined extreme portion of the numerical range, displaying in step 530 the value to the user.

Figure 6:
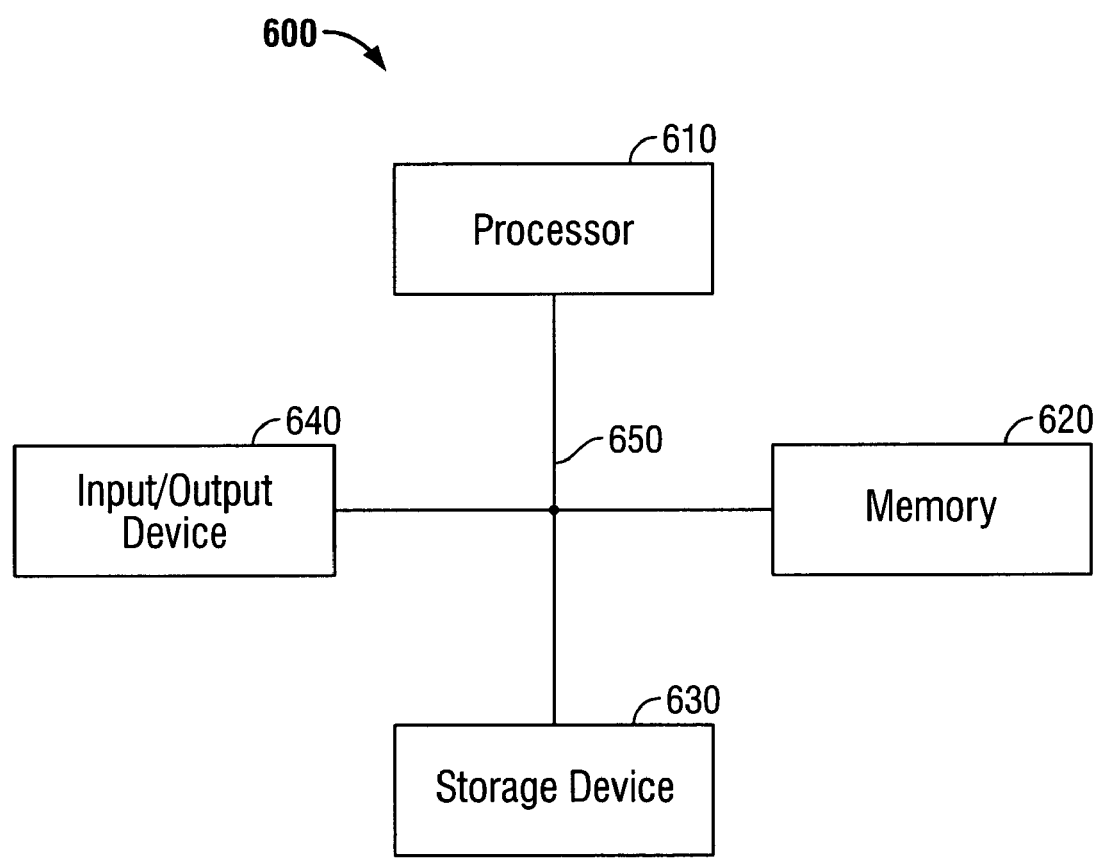
FIG. 6 is a block diagram of a computer system.

FIG. 6 is a block diagram of a computer system 600 that can be used in the operations described above, according to one embodiment. The system 600 includes a processor 610, a memory 620, a storage device 630 and an input/output device 640. Each of the components 610, 620, 630 and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

For example, the processing component 120 discussed with reference to FIGS. 1A, 1B, 2A and 2B above may include the processor 610 executing a software application that is stored in one of memory 620 and storage device 630.

The input/output device 640 provides input/output operations for the system 600. In one embodiment, the input/output device 640 includes a keyboard and/or pointing device. In one embodiment, the input/output device 640 includes a display unit for displaying graphical user interfaces as discussed above. For example, the user interface 110 discussed with reference to FIGS. 1A, 1B, 2A and 2B above may be displayed on a display unit that is included in the input/output device 640.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of using a limit variable in a computer system, the method comprising:
receiving a non-numeric expression entered by a user to set a limit variable stored in a computer system, which expression signifies to the user that the numerical range is unlimited, wherein the limit variable can only be set with a numerical value within a numerical range;
converting the non-numeric expression to a first numerical value that is within a predetermined extreme portion of the numerical range; and setting the limit variable with the first numerical value.

2. The method of claim 1, wherein the expression is selected from the group consisting of: a word, a phrase, a symbol, and combinations thereof.

3. The method of claim 1, wherein the limit variable is one selected from the group consisting of: an upper limit of the numerical range and a lower limit of the numerical range.

4. The method of claim 1, wherein a data model for the limit variable in the computer system provides a highest numerical value with which the limit variable can be set, and wherein the method further comprises selecting the predetermined extreme portion of the numerical range based on the highest numerical value.

5. The method of claim 1, further comprising selecting the predetermined extreme portion of the numerical range such that, practically, the first numerical value will never be met.

6. The method of claim 1, wherein the numerical range is a date range, the limit variable is an end date for the date range and the first numerical value is a first date, further comprising selecting the predetermined extreme portion such that, practically, a system date of the computer system will never reach the predetermined extreme portion of the date range.

7. A computer program product tangibly embodied in a machine-readable storage device including executable instructions that, when executed, cause a processor to perform operations comprising:
receive a non-numeric expression entered by a user to set a limit variable stored in a computer system, which expression signifies to the user that the numerical range is unlimited, wherein the limit variable can only be set with a numerical value within a numerical range;
convert the non-numeric expression to a first numerical value that is within a predetermined extreme portion of the numerical range; and
set the limit variable with the first numerical value.

8. The computer program product of claim 7, wherein the expression is selected from the group consisting of: a word, a phrase, a symbol, and combinations thereof.

9. The computer program product of claim 7, wherein a data model for the limit variable in a computer system provides a highest numerical value with which the limit variable can be set, and wherein the method further comprises selecting the predetermined extreme portion of the numerical range based on the highest numerical value.

10. The computer program product of claim 7, wherein the predetermined extreme portion of the numerical range is selected such that, practically, the first numerical value will never be met.

11. The computer program product of claim 7, wherein the numerical range is a date range, the limit variable is an end date for the date range and the first numerical value is a first date, and wherein the predetermined extreme portion is selected such that, practically, a system date of the computer system will never reach the predetermined extreme portion of the date range.

12. A computer-implemented method of using a limit variable in a computer system, the method comprising:
receiving a command to display a limit variable for a numerical range, the limit variable being stored in a computer system and being set with a numerical value within the numerical range;
determining whether the numerical value is within a predetermined extreme portion of the numerical range;
based on a determination that the numerical value is within the predetermined extreme portion of the numerical range, converting the numerical value to a non-numeric expression that signifies to a user that the numerical range is unlimited and displaying the non-numeric expression to a user; and
based on a determination that the numerical value is not within the predetermined extreme portion of the numerical range, displaying the numerical value to the user.

13. The method of claim 12, wherein the expression is selected from the group consisting of a word, a phrase, a symbol, and combinations thereof.

14. The method of claim 12, wherein the limit variable is one selected from the group consisting of: an upper limit of the numerical range and a lower limit of the numerical range.

15. The method of claim 12, wherein a data model for the limit variable in the computer system provides a highest numerical value with which the limit variable can be set, further comprising selecting the predetermined extreme portion of the numerical range based on the highest numerical value.

16. The method of claim 12, wherein the numerical range is a date range, the limit variable is an end date for the date range and the numerical value is a first date, further comprising selecting the predetermined extreme portion such that, practically, a system date of the computer system will never reach the predetermined extreme portion of the date range.

17. The method of claim 12, wherein the numerical value is within the predetermined extreme portion of the numerical range, and wherein the method further comprises, before receiving the command to display the limit variable:
receiving the expression, which expression is entered to set the limit variable; and
upon receiving the expression, setting the limit variable with the numerical value.

18. A computer program product tangibly embodied in a machine-readable storage device including executable instructions that when executed cause a processor to perform operations comprising:
receive a command to display a limit variable for a numerical range, the limit variable being stored in a computer system and being set with a numerical value within the numerical range;
determine whether the numerical value is within a predetermined extreme portion of the numerical range;
based on a determination that the numerical value is within a predetermined extreme portion of the numerical range, convert the numerical value to a non-numeric expression that signifies to a user that the numerical range is unlimited and display the expression to a user; and
based on a determination that the numerical value is not within the predetermined extreme portion of the numerical range, display the numerical value to the user.

19. The computer program product of claim 18, wherein the expression is selected from the group consisting of: a word, a phrase, a symbol, and combinations thereof.

20. The computer program product of claim 18, wherein the limit variable is one selected from the group consisting of: an upper limit of the numerical range and a lower limit of the numerical range.

21. The computer program product of claim 18, wherein a data model for the limit variable in the computer system provides a highest numerical value with which the limit variable can be set, and wherein the predetermined extreme portion of the numerical range is selected based on the highest numerical value.

22. The computer program product of claim 18, wherein the numerical range is a date range, the limit variable is an end date for the date range and the numerical value is a first date, and wherein the predetermined extreme portion is selected such that, practically, a system date of the computer system will never reach the predetermined extreme portion of the date range.

23. The computer program product of claim 18, wherein the numerical value is within the predetermined extreme portion of the numerical range, and wherein the operations further comprise, before receiving the command to display the limit variable:

receive the expression, which expression is entered to set the limit variable; and upon receiving the expression, set the limit variable with the numerical value.

\* \* \* \* \*